(12) United States Patent
Hotaling

(10) Patent No.: US 9,433,315 B2
(45) Date of Patent: Sep. 6, 2016

(54) SELF-CLEANING DRAIN FOR FOOD PREPARATION APPARATUS

(71) Applicant: ISLAND OASIS FROZEN COCKTAIL CO., INC., Walpole, MA (US)

(72) Inventor: Bryan R. Hotaling, Harvard, MA (US)

(73) Assignee: ISLAND OASIS FROZEN COCKTAIL COMPANY, INC., Walpole, MA (US)

( * ) Notice: Subject to any disclaimer, the term of this patent is extended or adjusted under 35 U.S.C. 154(b) by 54 days.

(21) Appl. No.: 14/232,000

(22) Filed: Apr. 1, 2014

(65) Prior Publication Data

US 2014/0209131 A1    Jul. 31, 2014

Related U.S. Application Data

(63) Continuation of application No. 13/025,083, filed on Feb. 10, 2011, now Pat. No. 8,684,047.

(51) Int. Cl.
| | |
|---|---|
| *A47J 31/60* | (2006.01) |
| *A47J 31/44* | (2006.01) |
| *A23G 9/04* | (2006.01) |
| *A23G 9/30* | (2006.01) |

(52) U.S. Cl.
CPC ............ *A47J 31/4428* (2013.01); *A23G 9/045* (2013.01); *A23G 9/30* (2013.01)

(58) Field of Classification Search
CPC ...... A47J 31/4428; A23G 9/045; A23G 9/30
USPC .......................... 141/85, 89–91, 98, 301–302
See application file for complete search history.

(56) References Cited

U.S. PATENT DOCUMENTS

| | | | |
|---|---|---|---|
| 3,336,957 A | 8/1967 | Goosman | |
| 3,461,934 A | 8/1969 | Waters | |
| 4,456,021 A | 6/1984 | Leavens | |
| 4,681,030 A | 7/1987 | Herbert | |
| 5,799,567 A | 9/1998 | Dorner | |
| 6,194,013 B1 | 2/2001 | Kolar et al. | |
| 6,342,260 B2 | 1/2002 | Kolar et al. | |
| 7,766,185 B2 | 8/2010 | Herbert | |
| 7,878,019 B2 | 2/2011 | Cantolino | |
| 8,434,319 B2 * | 5/2013 | Klier ...................... | A23G 9/045 222/1 |
| 8,684,047 B2 | 4/2014 | Hotaling | |

(Continued)

FOREIGN PATENT DOCUMENTS

| | | |
|---|---|---|
| DE | 41 36 923 A1 | 5/1993 |
| EP | 1 929918 A2 | 6/2008 |
| JP | 10-176351 | 6/1998 |

OTHER PUBLICATIONS

International Search Report for PCT/US2012/024314 mailed Jun. 4, 2012.

(Continued)

*Primary Examiner* — Nicolas A Arnett
(74) *Attorney, Agent, or Firm* — Sughrue Mion, PLLC

(57) ABSTRACT

A drain system for a food preparation machine includes a preparation area drain tray; a rinsing station including a water source; a water collection tray disposed below the rinsing station so as to collect water supplied from the water source; and, a passage from the rinsing station to the preparation area drain tray directing water to flush the preparation area drain tray with water supplied from the water source.

14 Claims, 5 Drawing Sheets

(56) References Cited

U.S. PATENT DOCUMENTS

| | | | |
|---|---|---|---|
| 8,807,823 B2* | 8/2014 | Williams | B01F 7/161 366/197 |
| 8,950,931 B2* | 2/2015 | Pryor, Jr. | B01F 7/161 366/138 |
| 2005/0127098 A1 | 6/2005 | Bertone | |
| 2006/0238346 A1 | 10/2006 | Teller | |
| 2007/0158353 A1 | 7/2007 | Herbert | |
| 2007/0267087 A1 | 11/2007 | Jones et al. | |
| 2008/0142095 A1 | 6/2008 | Van Der Linden | |
| 2008/0154389 A1 | 6/2008 | Smith et al. | |
| 2008/0230558 A1 | 9/2008 | Koerner et al. | |
| 2010/0139701 A1 | 6/2010 | Bigott | |
| 2010/0151083 A1* | 6/2010 | Klier | A23G 9/045 426/66 |
| 2011/0023723 A1 | 2/2011 | Morin et al. | |
| 2011/0048462 A1 | 3/2011 | Morin et al. | |
| 2011/0073212 A1 | 3/2011 | Erbs et al. | |
| 2012/0087203 A1* | 4/2012 | Williams | B01F 7/161 366/138 |
| 2012/0204342 A1* | 8/2012 | Hotaling | A23G 9/045 4/625 |
| 2014/0212566 A1* | 7/2014 | Herbert | A23G 9/04 426/590 |

OTHER PUBLICATIONS

International Search Report and Written Opinion of the International Searching Authority for PCT/US2011/023280 mailed May 17, 2011.

* cited by examiner

SELF-CLEANING DRAIN FOR FOOD PREPARATION APPARATUS

CROSS-REFERENCE TO RELATED APPLICATION

This application is a continuation of U.S. patent application Ser. No. 13/025,083 entitled "SELF-CLEANING DRAIN FOR FOOD PREPARATION APPARATUS," filed on Feb. 10, 2011, which is herein incorporated by reference in its entirety.

BACKGROUND

The present invention relates to food preparation apparatus, especially food preparation apparatus in which food spills are removed from a preparation and/or processing area through a drain.

Frozen drink preparation machines are an example of one type of food preparation apparatus commonly employing one or more drain pans and drains through which food spills are removed from a preparation and/or processing area.

SUMMARY OF INVENTION

According to aspects of an embodiment, a drain system for a food preparation machine includes a preparation area drain tray; a rinsing station including a water source; a water collection tray disposed below the rinsing station so as to collect water supplied from the water source; and, a passage from the rinsing station to the preparation area drain tray directing water to flush the preparation area drain tray with water supplied from the water source. In one variation, the passage is an inclined trough. In another variation, the passage is a tube. Yet other variations include a manifold dividing and directing water from a tube to plural outlets in the drain tray. Further variations include both a drain in the drain tray; and, at least one outlet in the drain in the drain tray. Another variation on any of the foregoing variations includes ridges in the drain tray constructed and arranged to direct water flow from the passage to areas where rinse water is desired before draining. According to one group of variations, the tube connects the water collection tray to the preparation area drain tray so as to carry water from the water collection tray to the preparation area drain tray. According to another group of variations, the tube connects the water source to the preparation area drain tray so as to carry water directly from the water source to the preparation area drain tray. In a variation having a tube connected to the water source, a valve controls the water source to selectively operate when rinsing is desired. In another variation having a tube connected to the water source, a valve in the tube controls when water is directed to the preparation area drain tray. Variations combinable with any of the foregoing include ridges in the drain tray constructed and arranged to direct water flow from the passage to areas where rinse water is desired before draining; a manifold dividing and directing water from the tube to plural outlets in the drain tray; and locating at least one outlet in a drain in the drain tray.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
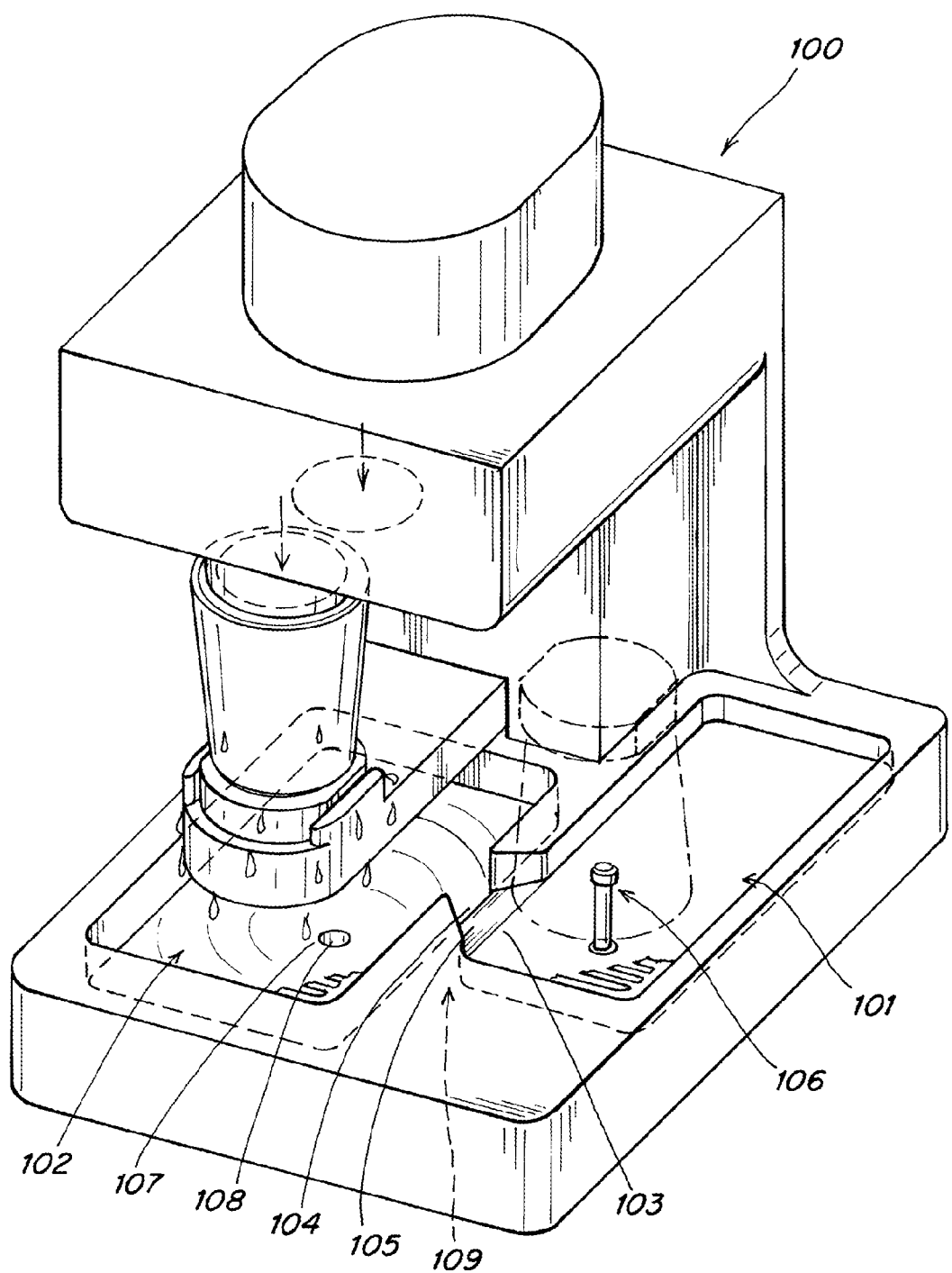
FIG. 1 is a perspective view of a first illustrative embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

An apparatus embodying aspects of the invention may include a food preparation and/or processing area where food is prone to spillage. An example of such an apparatus might be a beverage preparation machine, for example an automated frozen beverage blending machine. One such machine is illustrated in pending U.S. patent application Ser. No. 12/959,047, filed Dec. 2, 2010, entitled BLENDER WITH FEATURE FOR DISPENSING PRODUCT BY WEIGHT, by J. Michael Herbert, incorporated herein in its entirety by reference.

Commercial implementations of such machines include a drip tray having a drain, the drip tray disposed below the food preparation and/or processing areas, and frequently also include a pitcher and/or cup rinsing station adjacent the food preparation and/or processing areas. A frequent problem in such machines is the need to clear the drip tray and its drain of partly dried, congealed, and/or solid food matter so as to maintain a clean, sanitary work area, particularly clearing the drain of the drip tray of such material. Absent frequent cleaning, the drip tray, and especially its drain, could become sufficiently clogged that liquid food waste and drips could overflow the drip tray or result in other undesirable or unsanitary conditions.

Embodiments of aspects of the invention include features for directing water from the pitcher and/or cup rinsing station through the drip tray and its drain to dislodge partly dried, congealed, and/or solid food matter and flush it down the drip tray drain. Embodiments of aspects of the invention automatically maintain the cleanliness and free-flowing utility of the drip tray and its drain during ordinary machine operations, yet without wasting extra water on unnecessary rinses.

Figure 2:
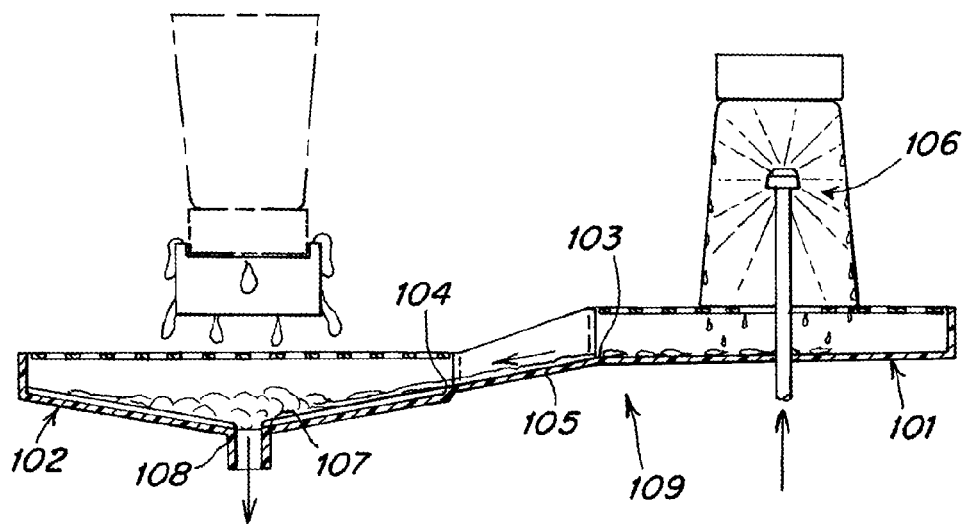
FIG. 2 is a cross-sectional view along line 2-2 of the illustrative embodiment of FIG. 1.

One illustrative system is a passive rinse system in which water from an adjacent rinse station is directed to a desired location in the drip tray using a trough that connects the rinse station water collection tray to the drip tray, as illustrated in FIGS. 1 and 2.

Figure 3:
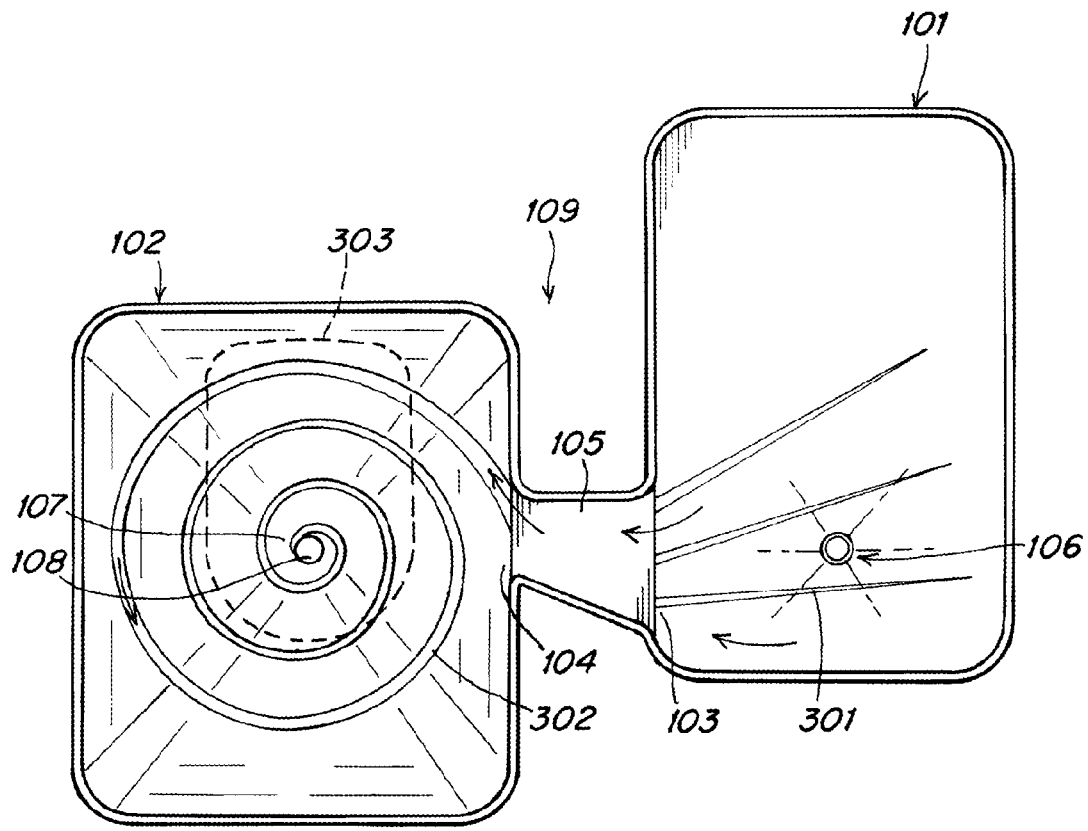
FIG. 3 is a plan view of a variation on the first illustrative embodiment.

As shown in FIGS. 1 and 2, the rinse station water collection tray, 101, is located at a position in a beverage preparation machine, 100, higher than the position at which the drip tray, 102, is located. The lowest point, 103, in the rinse station water collection tray, 101, is connected to a high point, 104, in the drip tray, 102, by a continuous trough, 105, through which water is conducted from the rinse station, 106, to the drip tray, 102. A low point, 107, in the drip tray, 102, accommodates a drain, 108, through which the rinse water is finally carried away. A single pan, 109, may include all the features of the rinse station water collection tray, 101, the drip tray, 102, and the trough, 105, between the two in a unitary, molded article, or the features may each be molded as a separate article to be joined as desired during assembly of the beverage preparation machine. The illustrated system thus provides a self-cleaning system at very low cost. Because one region of the system prone to obstruction by collected drips is the drip tray drain, 108, channels can be molded to run from the trough, 105, to the drain, 108, in a straight or spiral pattern as may be desired, so as to first distribute the rinse water and then concentrate the rinse water in the regions where it will do the most good. For example, as shown in FIG. 3, the channels, 301 and 302, can bring rinse water along straight, 301, and spiral, 302, paths to concentrate water in an area, 303, where drips tend to collect below the equipment above the drip tray, 102, after which it is directed most energetically towards the drain, 108, so as to flush the drain, 108, effectively.

Figure 4:
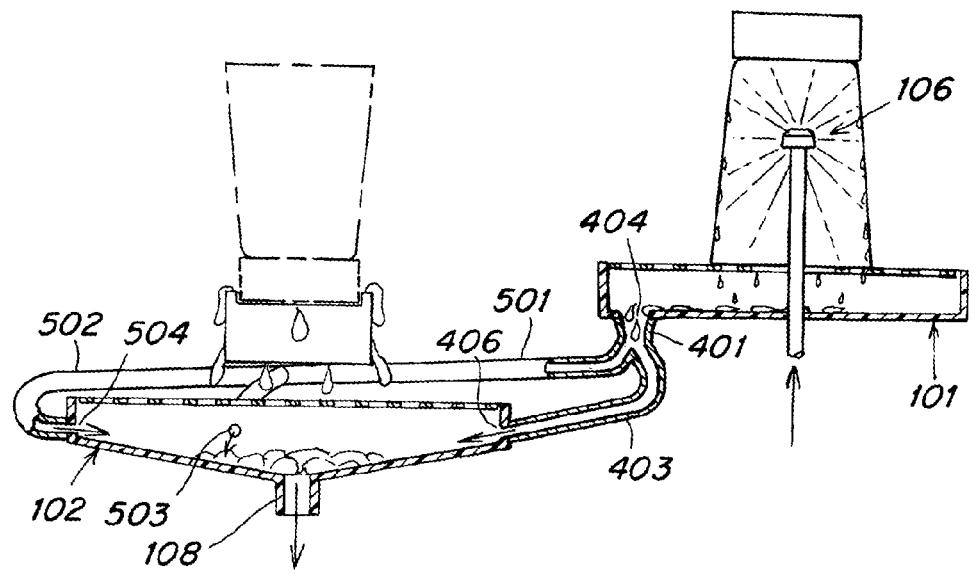
FIG. 4 is a cross-sectional view of a second illustrative embodiment.
Figure 5:
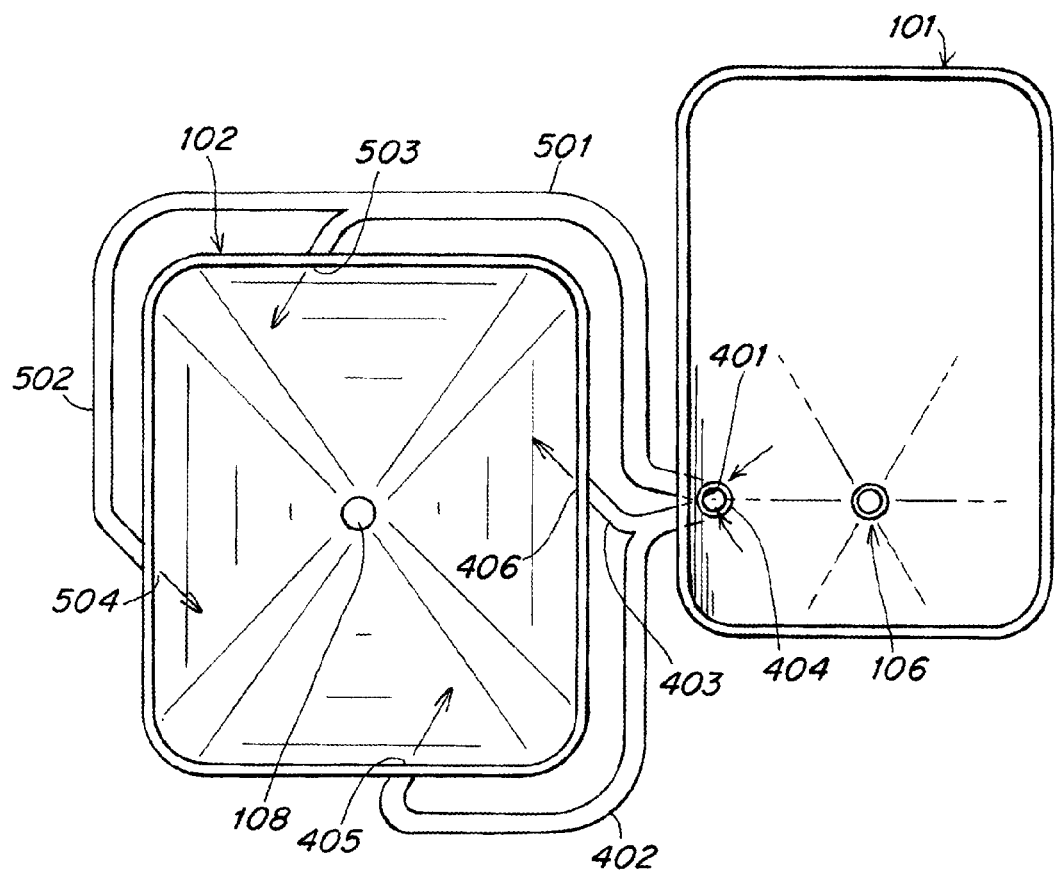
FIG. 5 is a plan view of a variation on the second illustrative embodiment.

A second illustrative system is a passive rinse system in which water from an adjacent rinse station, 106, is directed to a desired location in the drip tray, 102, using tubing, 401, that connects the rinse station water collection tray, 101, to the drip tray, 102, as illustrated in FIGS. 4 and 5. As will be explained, the tubing, 401, 402, 403, 501, and 502, helps to focus water rinse energy where needed, for example under the typical circumstance where only a limited head of water can be provided by the height difference between the rinse station water collection tray, 101, and the drip tray, 102.

Figure 6:
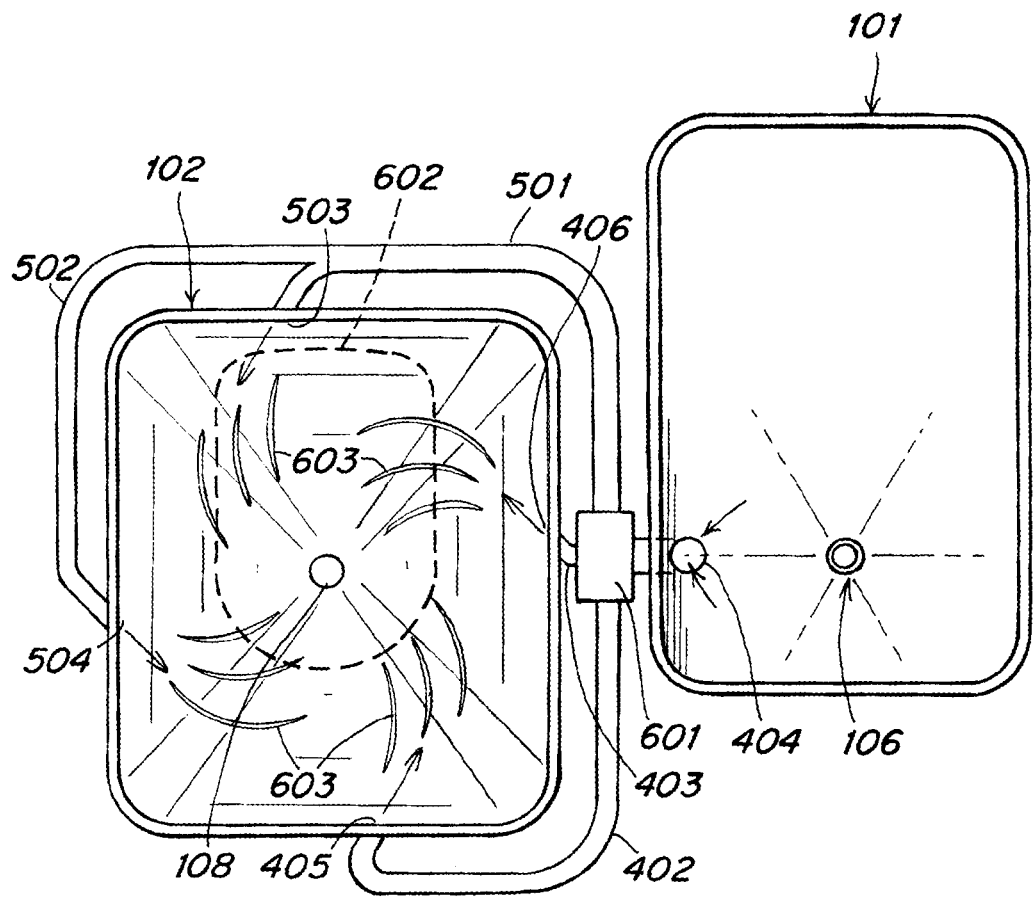
FIG. 6 is a plan view of another variation on the second illustrative embodiment.

Water collected in the water collection tray flows to a low point in the tray, at which there is a drain, 404, and an attached tube, 401. The tube, 401, leads directly to, or through one or more additional tubes, 402, 403, 501, 502 to one or more outlet ports, 405, 406, 503, and 504, in the drip tray Any of tubes 401, 402, 403, 501, and 502 may connect either directly or through a manifold, 601 (as shown in FIG. 6, for example) to the outlet ports, 405, 406, 503, and 504. The outlet ports, 405, 406, 503, and 504, are positioned so that water conducted from the water collection tray, 101, to the drip tray, 102, is directed to those parts, 602, of the drip tray, 102, where liquid and solid drippings from the preparation area of the machine tend to collect despite the drip tray bottom being inclined towards a drain, 108. The force of the water so directed tends to move the liquids and solids in the drip tray, 102, towards the drain, 108, and out of the machine. In this variation, the outlet ports, 405, 406, 503, and 504, can be sized to provide a desired volume and/or force of rinse water to each region of the drip tray, 102, dependent on the expected pattern of drips or likely clogs.

A variation on the second illustrative system is also a passive rinse using tubing, but with the addition of ridges and other texturing, 603, in the drip tray, 102, that focus the water rinse energy where needed, as illustrated in FIG. 6. This variation combines aspects of the first illustrative system and the second illustrative system. As will be explained, the tubing and ridges or other texturing both focus water rinse energy where needed and induce turbulence to aid in the rinse process.

Since the pattern of likely drips into the drip tray can, to some extent, be predicted, ridges can direct water from the outlets to which tubing conducts water to those areas of the drip tray most likely to require frequent rinsing. For example, water can be directed by the outlets in a substantial volume to an area below and circumscribing the location at which a blender cup is located while filling and/or mixing is performed. Ridges can then concentrate the volume of water in a spiral swirl at the drain to vigorously rinse the entry to the drain area. Varying the height of the bottom of the drip tray in this manner can produce more efficient rinsing and drainage in the areas where rinsing and drainage are needed.

Figure 7:
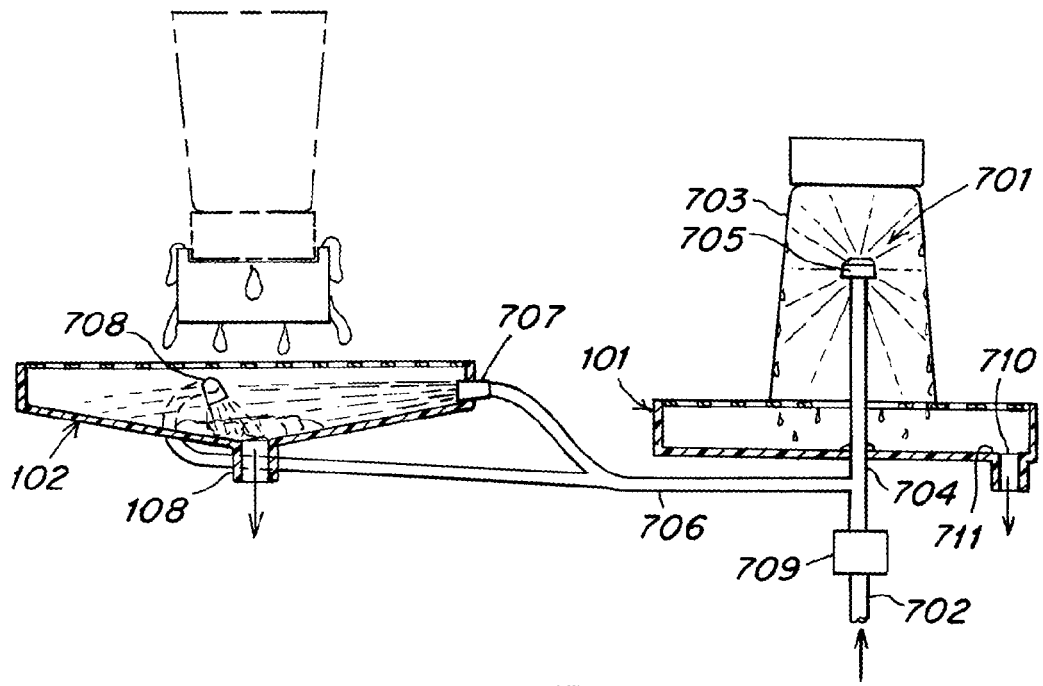
FIG. 7 is a cross-sectional view of a third illustrative embodiment.

According to a third illustrative system, illustrated by FIG. 7, an active rinse system is activated simultaneously with the rinse station, 701, by tapping the primary rinse water source, 702, to rinse down both items, 703, in the rinse station, 701, and the interior of the drip tray, 102. Such a system is activated by performance by a user of the primary rinse activity. As illustrated in FIG. 7, at least one tube, 704, conducts water from a rinse activation valve, 709, to a rinse head, 705, in the rinse station, 701, and at least one tube, 706, conducts water from the rinse activation valve to one or more rinse heads, 707 and 708, in the drip tray, 102. Each time the rinse station is activated, the drip tray, 102, is also rinsed down. One rinse head, 707, may rinse the upper portion of the drip tray, while a second rinse head, 708, may be directed to vigorously flush clear the drain, 108.

In this system, pressurized water is supplied to the drip tray from the same control valve that supplies rinse water to the rinse station. As a result, whenever food preparation cups or containers are rinsed at the rinse station, the drip tray is also rinsed of liquid and solid drippings. The drip tray and the water collection tray may advantageously be connected as shown in FIG. 1, so as to provide a single drain for the two regions. The tubing configuration and the shape of the bottom of the drip tray may be any of the configurations and shapes previously described, but pressurized water will provide a more effective rinse, in any case. Particularly useful in a pressurized system, at least one rinse head may be provided at or near the drain of the drip tray, so as to effectively flush viscous and solid material down the drain, reducing and/or eliminating a source of clogging of the drain system.

If the drip tray and the water collection tray are not connected as shown in FIG. 1, but rather as shown in FIG. 7, then a drain 710 is located at low point 711 of the water collection tray. Rinse water exits drain 710 that in previously described embodiments would exit through a drain in the drip tray.

Figure 8:
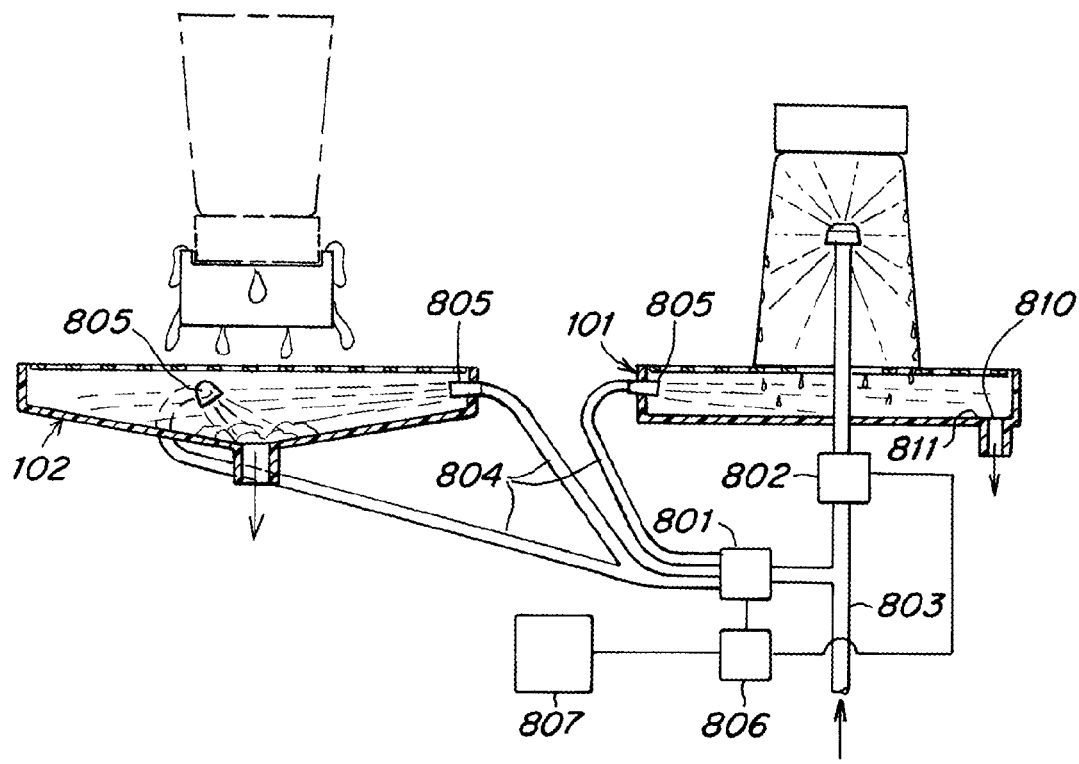
FIG. 8 is a cross-sectional view of a variation on the third illustrative embodiment including a separate tray rinse valve.

A variation on the third illustrative system, shown in FIG. 8, also includes an independent, active rinse system. Instead of being activated by rinse activity at the rinse station, this variation is activated by operation of a timer or by a manual user request for the rinse station and drip tray to be rinsed down. A valve, 801, separate from the rinse station rinse valve, 802, taps into the rinse station water supply, 803, and selectively directs water through tubes, 804, and outlets, 805, to rinse down the water collection tray, 101, and the drip tray, 102, whenever desired.

Many food preparation machines now have electronic controllers in which a system such as this can be readily incorporated. The rinse actuation valve, 801, is provided with an electronic actuator, 806, either instead of a manual actuator or in addition to a manual actuator. The electronic actuator, 806, is then controlled by the electronic controller, 807, of the food preparation machine to rinse both the rinse station water collection tray, 101, and the drip tray, 102, either on a regular schedule, when the controller has collected usage statistics for the machine that indicate rinsing of the trays may be desirable, or when requested by a user using a manual request input to the electronic controller, 807.

As in the exemplary embodiment of FIG. 7, if the drip tray and the water collection tray are not connected as shown in FIG. 1, but rather as shown in FIG. 8, then a drain 810 is located at low point 811 of the water collection tray. Rinse water exits drain 810 that in previously described embodiments would exit through a drain in the drip tray.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage preparation machine comprising:
    a beverage processing station including a blender and a drip tray disposed below the blender to collect fluids from the blender during processing, the drip tray being configured to collect fluids and deliver the fluids to a drain;
    a rinse station positioned laterally away from the beverage processing station, the rinse station including a water source and a water collection tray and being configured to rinse an inverted blender cup, the water collection tray being positioned at a higher elevation than the drip tray; and
    a passage permitting fluid communication from the water collection tray to the drip tray.

2. The beverage preparation machine of claim 1, wherein the passage comprises a trough.

3. The beverage preparation machine of claim 2, wherein the water collection tray has a low point located adjacent to the trough.

4. The beverage preparation machine of claim 3, wherein the trough is inclined from the water collection tray to the drip tray.

5. The beverage preparation machine of claim 4, wherein the drip tray has a low point at the drain.

6. The beverage preparation machine of claim 5, wherein the drip tray, the water collection tray, and the trough are formed from a pan.

7. The beverage preparation machine of claim 6, wherein the pan is formed from a molded, unitary body.

8. The beverage preparation machine of claim 5, wherein the drain has an outlet.

9. The beverage preparation machine of claim 5, wherein the drip tray has channels formed therein, the channels being configured to direct water flow from the trough to areas where rinse water is desired before draining.

10. The beverage preparation machine of claim 9, wherein the channels of the drip tray are formed in a shape of a spiral.

11. The beverage preparation machine of claim 10, wherein the water collection tray has channels formed therein, the channels being configured to direct water flow to the trough.

12. The beverage preparation machine of claim 1, wherein the water source includes an outlet positioned above the water collection tray.

13. The beverage preparation machine of claim 1, wherein the blender includes a blender cup supported above the drip tray.

14. The beverage preparation machine of claim 1, wherein the passage comprises a tube.

\* \* \* \* \*